US009398193B2

(12) United States Patent
Kuwano et al.

(10) Patent No.: US 9,398,193 B2
(45) Date of Patent: Jul. 19, 2016

(54) IMAGE PROCESSING APPARATUS AND IMAGE PROCESSING METHOD

(71) Applicant: Oki Data Corporation, Tokyo (JP)

(72) Inventors: Tetsuaki Kuwano, Tokyo (JP); Norihide Miyamura, Tokyo (JP); Toshihiro Doi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/571,644

(22) Filed: Dec. 16, 2014

(65) Prior Publication Data
US 2015/0172509 A1 Jun. 18, 2015

(30) Foreign Application Priority Data

Dec. 18, 2013 (JP) .................... 2013-261114

(51) Int. Cl.
H04N 1/40 (2006.01)
G06K 9/46 (2006.01)
H04N 1/411 (2006.01)
H04N 1/64 (2006.01)
H04N 1/419 (2006.01)
H04N 5/14 (2006.01)
H04N 7/01 (2006.01)
H04N 7/08 (2006.01)

(52) U.S. Cl.
CPC .......... H04N 1/411 (2013.01); H04N 1/40062 (2013.01); H04N 1/419 (2013.01); H04N 1/648 (2013.01); H04N 5/142 (2013.01); H04N 7/01 (2013.01); H04N 7/08 (2013.01); H04N 2201/0081 (2013.01); H04N 2201/0093 (2013.01)

(58) Field of Classification Search
CPC ..... H04N 1/40; H04N 1/40062; H04N 1/411; H04N 1/409
USPC .............. 358/426.04, 426.02, 3.22; 382/239, 382/232, 270, 271, 298, 299
See application file for complete search history.

(56) References Cited

U.S. PATENT DOCUMENTS

2014/0085680 A1* 3/2014 Kuwano ........................ 358/2.1

FOREIGN PATENT DOCUMENTS

JP 11-177977 A 7/1999

* cited by examiner

Primary Examiner — Cheukfan Lee
(74) Attorney, Agent, or Firm — Muncy, Geissler, Olds & Lowe, P.C.

(57) ABSTRACT

An image processing apparatus includes an attribute image generation part that analyzes image data of an original image and generates image data of an attribute image for each pixel, the attribute image having a first attribute value, a compression image generation part that generates image data of a first compression image that includes a compression image of the first part image and image data of a second compression image, and a format part that generates, based on the image data of the attribute image, image data that shows the first attribute value for each pixel as selection data being used to select a pixel value of each pixel, and generates data in a multilayer data format that includes the selection data, the image data of the first compression image and the image data of the second compression image.

7 Claims, 14 Drawing Sheets

| | 290a | 290b | | 290c |
|---|---|---|---|---|
| | First Attribute Value | Second Attribute Value | | |
| | 0 | 0 | | Not Refer |
| | 0 | 1 | | Not Refer |
| | 1 | 0 | | Refer |
| | 1 | 1 | | Refer |

| | 291a | 291b | | 291c |
|---|---|---|---|---|
| | First Attribute Value | Second Attribute Value | | |
| | 0 | 0 | | Refer |
| | 0 | 1 | | Not Refer |
| | 1 | 0 | | Not Refer |
| | 1 | 1 | | Not Refer |

IMAGE PROCESSING APPARATUS AND IMAGE PROCESSING METHOD

CROSS REFERENCE

The present application is related to, claims priority from and incorporates by reference Japanese Patent Application No. 2013-261114, filed on Dec. 18, 2013.

TECHNICAL FIELD

The present invention relates to an image processing apparatus and an image processing method.

BACKGROUND

Image data has a huge amount of information. Therefore, reduction in the load on networks and decrease in the pressure on recording media have generally been pursued by compressing image data and decreasing the amount of information. In recent years, in accordance with the spread and standardization of portable document format (PDF), a format in which images can be represented with a multilayer structure can be used by general users. By using the multilayer structure, as described in Japanese Patent Application Laid-open No. H11-177977), image data of document images that natural images and text images are mixed can be efficiently compressed as maintaining image qualities. Such image representation is called mixed raster content (MRC). In MRC, it is usual to represent image data that is a compression target with three layers that are a foreground image layer with low resolution, a background image layer with low resolution, and a foreground musk layer with high resolution. Also, in order to decrease the effect of information loss due to decrease in resolution, when the foreground image layer and background image layer are generated, a method is commonly used. In the method, the image data of the compression target is separated to image data of the foreground image layer and image data of the background image layer without temporarily changing their resolution, and the decrease in resolution is performed later.

However, in the conventional method, image data of the foreground image layer and image data of background image layer are generated without changing their resolutions and the image data of both of the layers is held so that large buffer is required. As a result, there is a problem that a circuit capacity becomes huge.

In order to solve the problem, an object of the present invention is to enable image data to be compressed with a small circuit while a large buffer is not required.

An image processing apparatus disclosed in the application includes: an attribute image generation part that analyses image data of an original image and generates image data of an attribute image for each pixel, the attribute image having a first attribute value that shows whether or not a pixel is attributed to a predetermined first part image; a compression image generation part that, by dividing the image data of the original image into a plurality of unit blocks each of which has a plurality of pixels, by referring to the image data of the attribute image and by changing pixel values of the plurality of pixels included in each of the plurality of unit blocks to a pixel value of one pixel, generates image data of a first compression image that includes a compression image of the first part image and image data of a second compression image that includes a compression image of a second part image that is other part of the original image than the first part image; and a format part that generates, based on the image data of the attribute image, image data that shows the first attribute value for each pixel as selection data, the selection data being used to select a pixel value of each pixel from the image data of the first compression image and the image data of the second compression image, and generates data in a multilayer data format that includes the selection data, the image data of the first compression image and the image data of the second compression image.

An image processing method includes an attribute image generation part that analyses image data of an original image and generates image data of an attribute image for each pixel, the attribute image having a first attribute value that shows whether a pixel is attributed to a predetermined first part image; an image generation process that, by dividing the image data of the original image into a plurality of unit blocks each of which has a plurality of pixels, by referring to the image data of the attribute image, and by changing pixel values of the plurality of pixels included in each of the plurality of unit blocks to a pixel value of one pixel, generates image data of a first compression image that includes a compression image of the first part image and image data of a second compression image that includes a compression image of a second part image that is other part of the original image than the first part image; and a format process that generates image data that shows the first attribute value for each pixel as selection data based on the image data of the attribute image, the selection data being used to select a pixel value of each pixel from the image data of the first compression image and the image data of the second compression image, and generates data in a multilayer data format that includes the selection data, the image data of the first compression image, and the image data of the second compression image.

According to one embodiment of the present invention, it is possible to compress image data with a small circuit while a large buffer is not required.

BRIEF DESCRIPTION OF DRAWINGS

FIGS. 13A and 13B are schematic charts that show a foreground reference pixel determination table and a background reference pixel determination table included in reference pixel determination information according to the second embodiment.

DETAILED DESCRIPTION OF EMBODIMENTS

Figure 1:
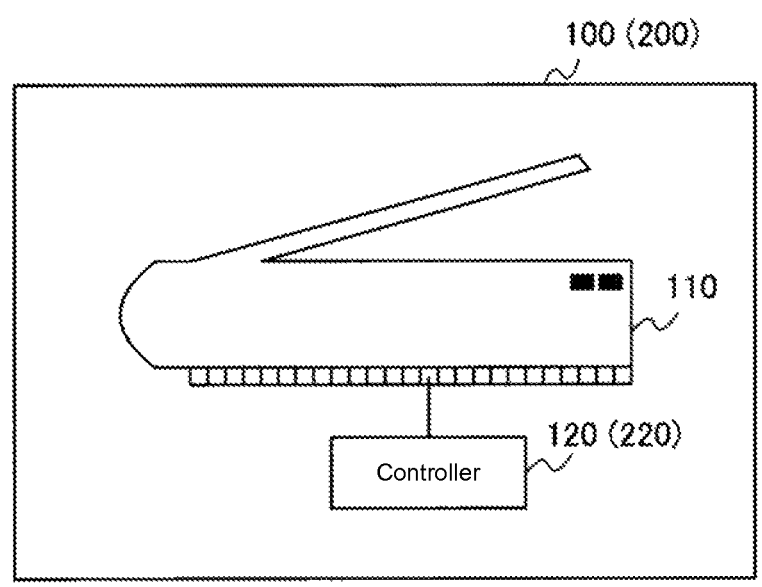
FIG. 1 is a schematic configuration view of an image processing apparatus according to first and second embodiments.

First Embodiment (Explanation of Configuration) FIG. 1 is a schematic configuration view of an image processing apparatus 100 according to a first embodiment. The image processing apparatus 100 includes an image input part 110 and a controller 120. The image processing apparatus 100 executes an image processing method according to the first embodiment. Reference numbers in parentheses in FIG. 1 show configurations according to a second embodiment.

The image input part 110 obtains image data of an original image from a manuscript such as documents. For example, the image input part 110 obtains image data for each line from the manuscript, and the obtained image data for each line (hereinafter, referred to as input image data) is sent to the controller 120. The image input part 110 may be configured with a scanner, etc.

The controller 120 generates compressed image data from the input image data sent from the image input part 110.

Figure 2:
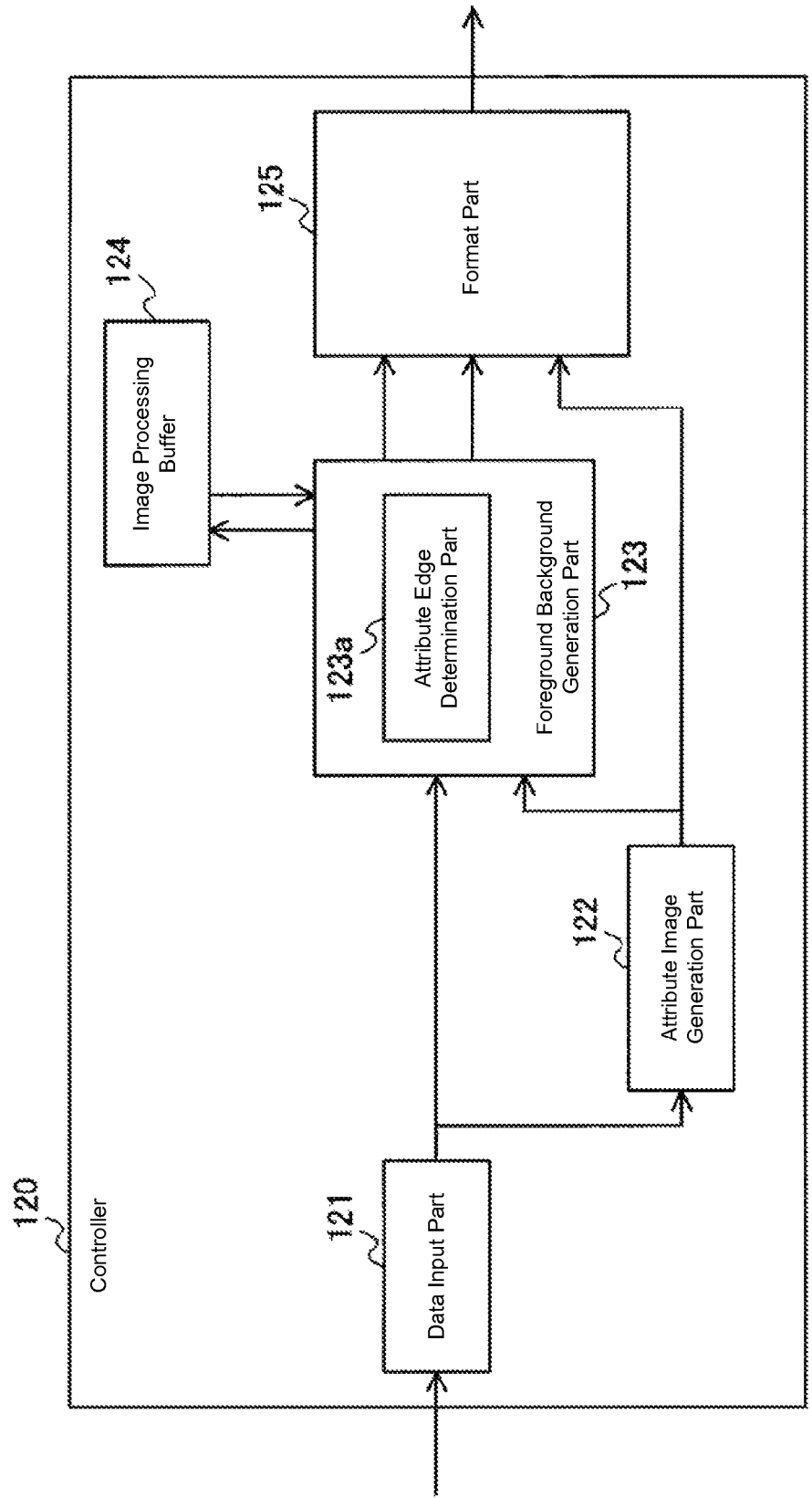
FIG. 2 is a block diagram that schematically shows a configuration of a controller 120 according to the first embodiment.

FIG. 2 is a block diagram that schematically shows a configuration of the controller 120 according to the first embodiment. The controller 120 includes a data input part 121, an attribute image generation part 122, an foreground background generation part 123 as a compressed image generation part, an image processing buffer 124, and a format part 125.

The data input part 121 obtains the input image data sent from the image input part 110. The obtained input image data is sent to the attribute image generation part 122 and the foreground background generation part 123. The attribute image generation part 122 analyzes image data of the original image sent from the data input part 121, and generates for each pixel image data (attribute image data) of an attribute image having a first attribute value that shows whether or not the pixel is attributed to a predetermined first part image. Herein, the original image has a first part image (in the present embodiment, foreground made of texts and lines) and a second part image (in the present embodiment, background other than the foreground). Specifically, the attribute image generation part 122 specifies the first attribute value that shows whether each pixel is a pixel included in any one of text region and line region based on the input image data sent from the data input part 121. Then, the attribute image generation part 122 generates attribute image data that shows the first attribute value for each pixel. Because the input image data is data for each line, the attribute image generation part 122 generates image data for each line as the attribute image data, and sends the image data for each line (hereinafter, referred to as input attribute image data) to the foreground background generation part 123 and the format part 125.

The foreground background generation part 123 divides the image data of the original image into a plurality of unit blocks. Hereinafter, in order to simplify description, the plurality of unit blocks may be described in a singular form. The unit block has a plurality of pixels. The unit block has a plurality of pixels that work as a change unit of resolution. The foreground background generation part 123 refers to the attribute image data, changes pixel values of the plurality of pixels to a pixel value of a pixel as, and then generates image data of a first compressed image that includes a compressed image of the first part image and image data of a second compressed image that includes a compressed image of the second part image that is other part of the original image than the first part image. For example, the foreground background generation part 123 specifies a pixel recognized as the foreground image as the first part image and a pixel recognized as background image as the second part image, performs resolution change of the input image data sent from the data input part 121 simultaneously on the foreground and background, and then generates foreground data and background data. Specifically, regarding the input image data and the input attribute image data, the foreground background generation part 123 lets the image processing buffer 124 memorize data of lines required for the resolution change, refers to the data, performs the resolution change on the image data, and generates the foreground image data and background image data. Then, the foreground background generation part 123 sends the generated foreground image data and background image data to the format part 125. The foreground background generation part 123 is provided with an attribute edge determination part 123a. The attribute edge determination part 123a performs determination whether a unit block includes an edge based on the attribute image data. Specifically, the attribute edge determination part 123a refers to the attribute image data, and determines whether all pixels included in a unit block are attributed to the foreground image, whether all pixels in an unit block are attributed to the background image, or whether all pixels in an unit block are attributed to both the foreground image and the background image. The foreground background generation part 123 switches methods of the resolution changes of the foreground and background based on the determination result of the attribute edge determination part 123a.

The image processing buffer 124 is a temporary memory part that memorizes the input image data and the input attribute image data required for the resolution change. The format part 125 generates image data that shows the first attribute value for each pixel as selection data based on the attribute image data. The selection data is used to select a pixel value for each pixel from the image data of the first compressed image and the image data of the second compression image. Then, the format part 125 generates data in a multilayer data format that includes the selection data, the image data of the first compression image, and the image data of the second compression image. For example, the format part 125 changes the foreground image data and the background image data sent from the foreground background generation part 123 respectively to image data of the foreground image layer and image data of the background image layer that configure MRC. Also, the format part 125 changes the attribute image data sent from the attribute image generation part 122 to image data of a foreground mask layer that configures MRC. Accordingly, the format part 125 generates compression image data in an image format having a multilayer structure.

Note, the controller 120 may be realized by a part of a circuit that performs a signal process or by assembling circuits, and may be realized by software that is operated by a commonly used hardware.

Figure 3:
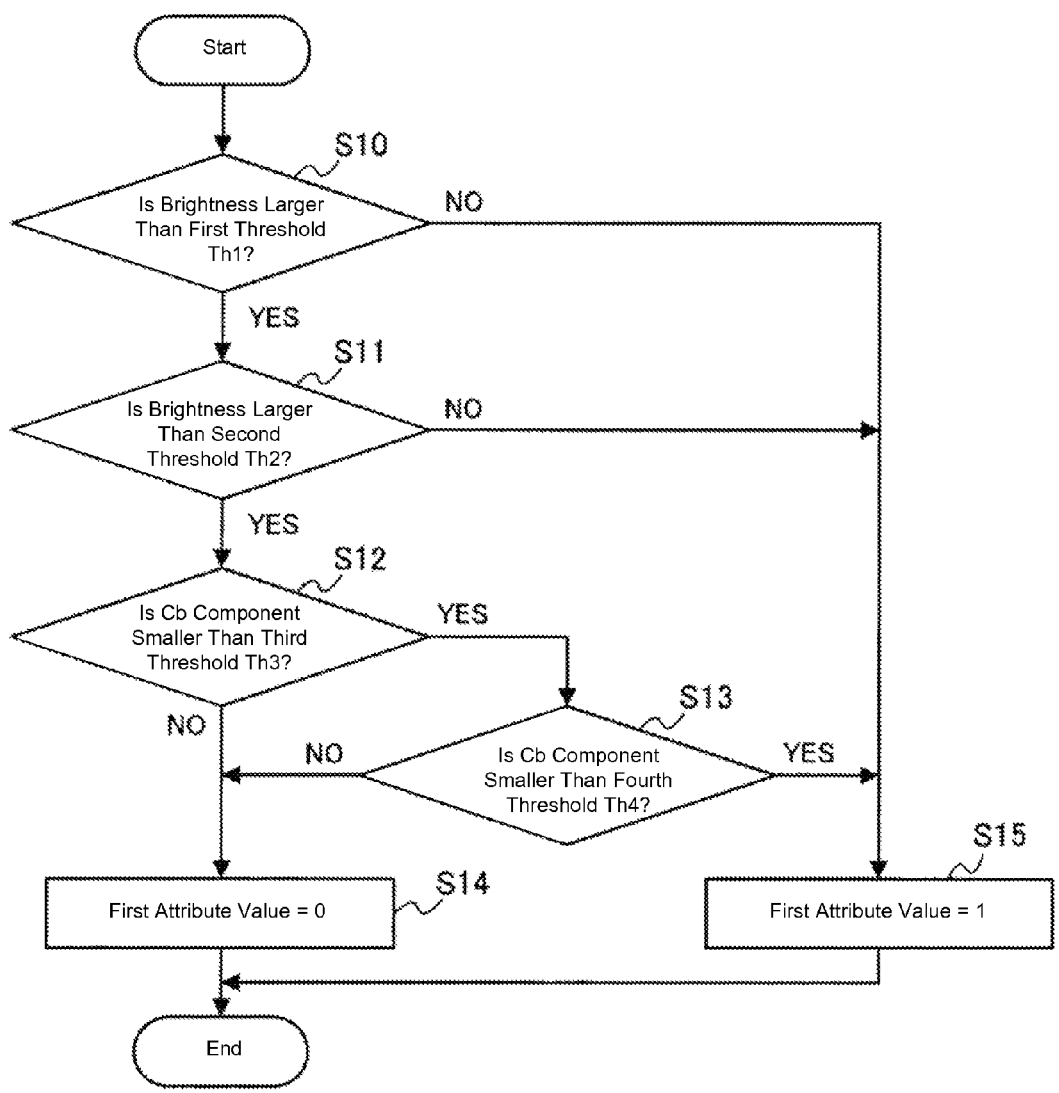
FIG. 3 is a flow diagram that shows a process of deciding a first attribute value based on input image data according to the first embodiment.

(Description of Operation) FIG. 3 is a flow diagram that shows a process of deciding a first attribute value based on input image data. Herein, the attribute image generation part 122 conducts the flow illustrated in FIG. 3 for each pixel included in the input image data. In the flow diagram, a pixel that is a target for deciding the first attribute value is referred to as target pixel. Note, when the first attribute value is "1", the pixel is the text region or the line region (attributed to the foreground image), and when the first attribute value is "0", the pixel is the non-text region and non-line region (attributed to the background image). In the text region of the manuscript image, a text is illustrated in a piece of white paper. In other words, the brightness of the text region is lower than that of surrounding pixels thereof.

The attribute image generation part 122 determines whether the brightness of a target pixel is larger than a predetermined first threshold Th1 (S10). When the brightness of the target pixel is larger than the first threshold Th1 (Yes in S10), the process proceeds to S11. When the brightness of the target pixel is the first threshold Th1 or less (No in S10), the process proceeds to S15.

In S11, the attribute image generation part 122 determines whether the brightness of the target pixel is larger than a second threshold Th2 that is determined from an average value of surrounding pixels of the target pixel. For example, the second threshold may be an average value of brightness of pixels included in a region of n pixel×n pixel including the target pixel (herein, n is a positive integer of 2 or more and is predetermined), or may be a value that is the average value multiplied by or added to a predetermined coefficient. When the brightness of the target pixel is larger than the second threshold 2 Th2 (Yes in S11), the process proceeds to S12. When the brightness of the target pixel is the second threshold Th2 or less (No in S11), the process proceeds to S15.

Because only with the reference to the brightness, it is difficult to extract yellow texts, the attribute image generation part 122 specifies a value of Cb component in YCbCr color space representation based on the pixel value of the target pixel, and determines whether the target pixel is the text region or the line region. In S12, the attribute pixel generation part 122 determines whether a value of Cb component of the target pixel is smaller than a predetermined third threshold Th3. When the value of Cb component of the target pixel is smaller than the third threshold Th3 (Yes in S12), the attribute pixel generation part 122 determines that the target pixel is yellow, and the process proceeds to S13. When the value of Cb component of the target pixel is the third threshold Th3 or more (No in S12), the attribute pixel generation part 122 determines that the target pixel is not yellow and the process proceeds to S14.

In S13, whether the value of Cb component of the target pixel is less than a fourth threshold Th4 is determined. For example, the fourth threshold Th4 may be an average value of values of Cb component of pixels included in a region of m pixel×m pixel including the target pixel (herein, m is a positive integer of 2 or more and is predetermined), or may be a value that is the average value multiplied by or added to a predetermined coefficient. When the value of Cb component of the target value is less than the fourth threshold Th4 (Yes in S13), the attribute image generation part 122 determines that the target pixel is recognized as a yellow text region or a yellow line region, and the process proceeds to S15. When the value of Cb component of the target pixel is the fourth threshold Th4 or more (No in S13), the attribute image generation part 122 determines that the target pixel is not recognized as the yellow text region or the yellow line region, and the process proceeds to S14.

In S14, the attribute pixel generation part 122 sets that the first attribute value of the target pixel is "0". On the other hand, in S15, the attribute image generation part 122 sets that the first attribute value of the target pixel is "1".

Figure 4:
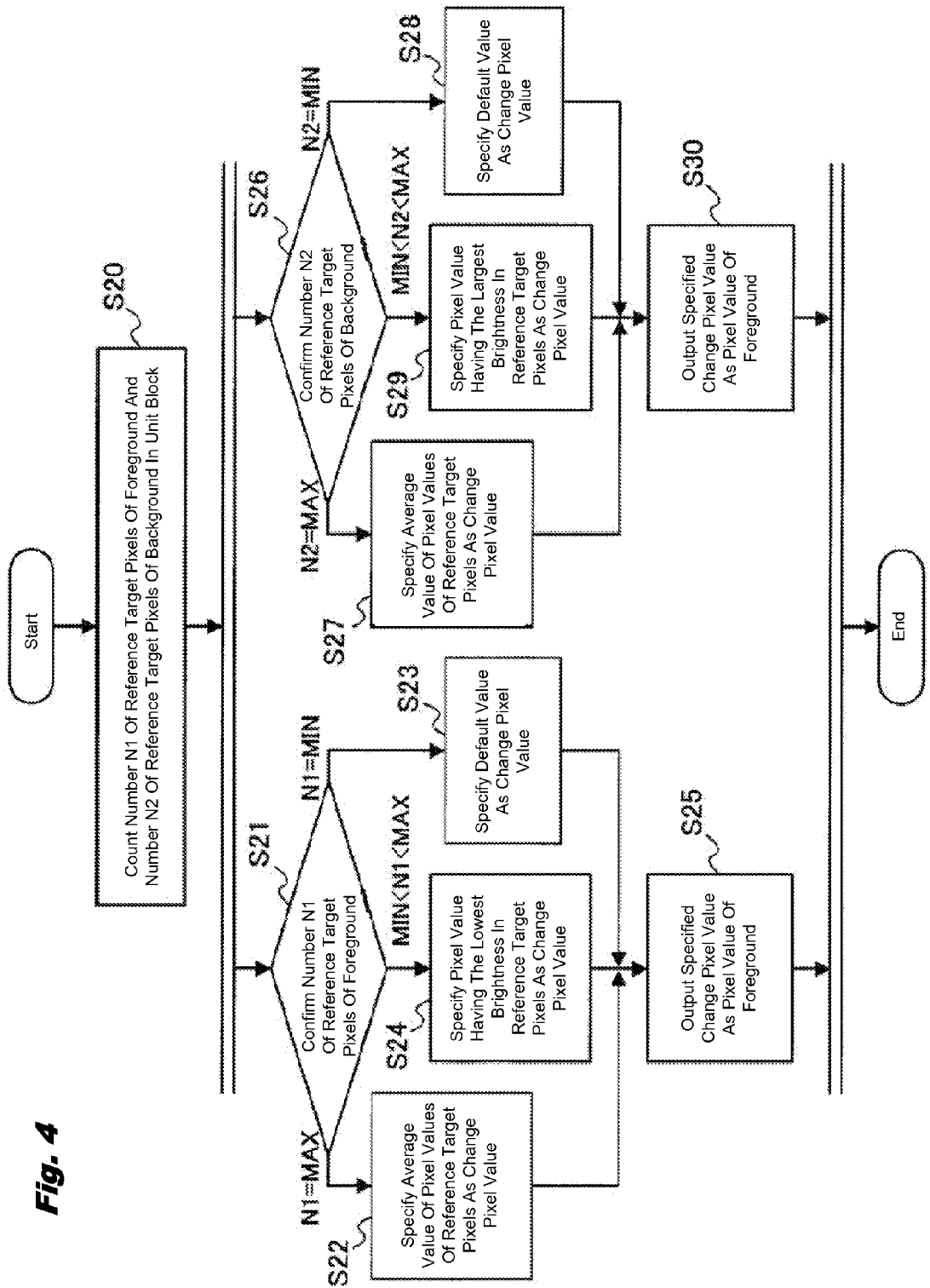
FIG. 4 is a flow diagram that shows a process of generating foreground image data and background image data according to the first embodiment.

FIG. 4 is a flow diagram that shows a process that the foreground background generation part 123 generates foreground image data and background image data. In the first embodiment, a region of 3 pixel×3 pixel is set as a unit block that is a unit for the resolution change. The foreground background generation part 123 calculates a pixel value of one pixel from pixel values of pixels included in the unit block, and decreases a resolution of image data.

The attribute edge determination part 123*a* counts number N1 of pixels referred to as the foreground and number N2 of pixels referred to as the background based on the input attribute image data sent from the attribute image generation part 122 (S20). Herein, the pixel referred to as the foreground is a pixel whose first attribute value is "1", and the pixel referred to as the background is a pixel whose first attribute value is "0". The foreground background generation part 123 processes S21 and S26 after S20, and determines an existence of an edge between the foreground and the background in the unit block based on the number counted by the attribute edge determination part 123*a*, and switch the process of the resolution change.

In S21, the attribute edge determination part 123*a* confirms that the number N1 counted as pixels referred to as the foreground. When the number N1 is a maximum value (herein "9"), the attribute edge determination part 123*a* determines that the pixels in the unit block are all the foreground pixels, and then the process proceeds to S22. When the number N1 is minimum value (herein "0"), the attribute edge determination part 123*a* determines that the pixels in the unit block are all the background pixels, and then the process proceeds to S23. When the number N1 is larger than the minimum value and smaller than the maximum value, the attribute edge determination part 123*a* determines that an edge between the background and the foreground is included in the unit block and the process proceeds to S24.

In S22, the foreground background generation part 123 specifies an average value of pixel values of pixels in the unit block as a change pixel value that is a resolution change result. In S23, the foreground background generation part 123 specifies a predetermined first default value (herein pixel value of black pixel) as a change pixel value to identify texts and lines as the foreground. In S24, the foreground background generation part 123 specifies a pixel value of a pixel that has the lowest brightness in the pixels in the unit block as the change pixel value. Then, the foreground background generation part 123 sends the change pixel value specified as described above to the format part 125 as a pixel value of the foreground image data (S25).

In S26, the attribute edge determination part 123*a* confirms that the number N2 counted as pixels referred to as the background. When the number N2 is a maximum value (herein "9"), the attribute edge determination part 123*a* determines that the pixels in the unit block are all the background pixels, and then the process proceeds to S27. When the number N2 is minimum value (herein "0"), the attribute edge determination part 123*a* determines that the pixels in the unit block are all the foreground pixels, and then the process proceeds to S28. When the number N2 is larger than the minimum value and smaller than the maximum value, the attribute edge determination part 123a determines that an edge between the background and the foreground is included in the unit block and the process proceeds to S29.

In S27, the foreground background generation part 123 specifies an average value of pixel values of pixels in the unit block as a change pixel value that is a resolution change result. In S28, the foreground background generation part 123 specifies a predetermined second default value (herein pixel value of white pixel) as a change pixel value to identify as background. In S29, the foreground background generation part 123 specifies a pixel value of a pixel that has the highest brightness in the pixels in the unit block as the change pixel value. Then, the foreground background generation part 123 sends the change pixel value specified as described above to the format part 125 as a pixel value of the background image data (S30).

Figure 5:
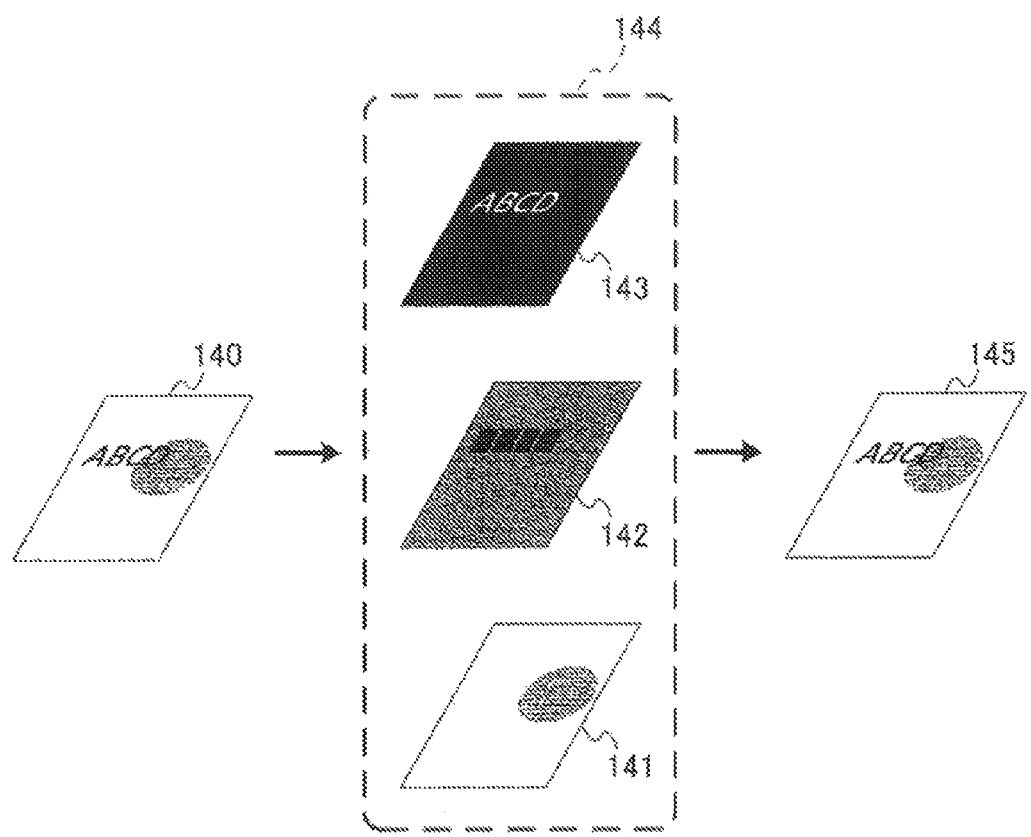
FIG. 5 is a schematic diagram that shows one example of data configuration in MRC.

(Description of Effects) FIG. 5 is a schematic diagram that shows one example of data configuration in MRC. In compression using MRC, image data of one sheet of an image 140 that is a compression target is divided into image data of three sheets of images: image data of a background image 141; image data of a foreground image 142; and image data of a mask image 143 that shows an illustration region of foreground, and is collected in a format 144 in which image representation in a multilayer structure such as PDF is possible.

The mask image 143 represents text shapes, etc. with a high resolution as the same as the original image 140. Due to the resolution change, the background image 141 and the foreground image 142 are represented with a resolution lower than that of the original image 140. In the image 145 that is a result of a decompression process, the foreground image 142 with a low resolution is illustrated on the background image 141 with a low resolution as following text shapes, etc. illustrated by the mask image 143, and therefore illustration of text shapes, etc. has a high resolution.

On the image 145 that is a result of the decompression process, text color in fine portions, etc. may change as compared to the pre-compression image 140. However, while decreasing a huge amount of data, it is possible to precisely reconstruct text shapes, etc., which are important to identify texts, etc. For the mask image 143, a binary image may be used, such as an image that has the same value as that of the attribute image generated in the first embodiment.

Figure 6:
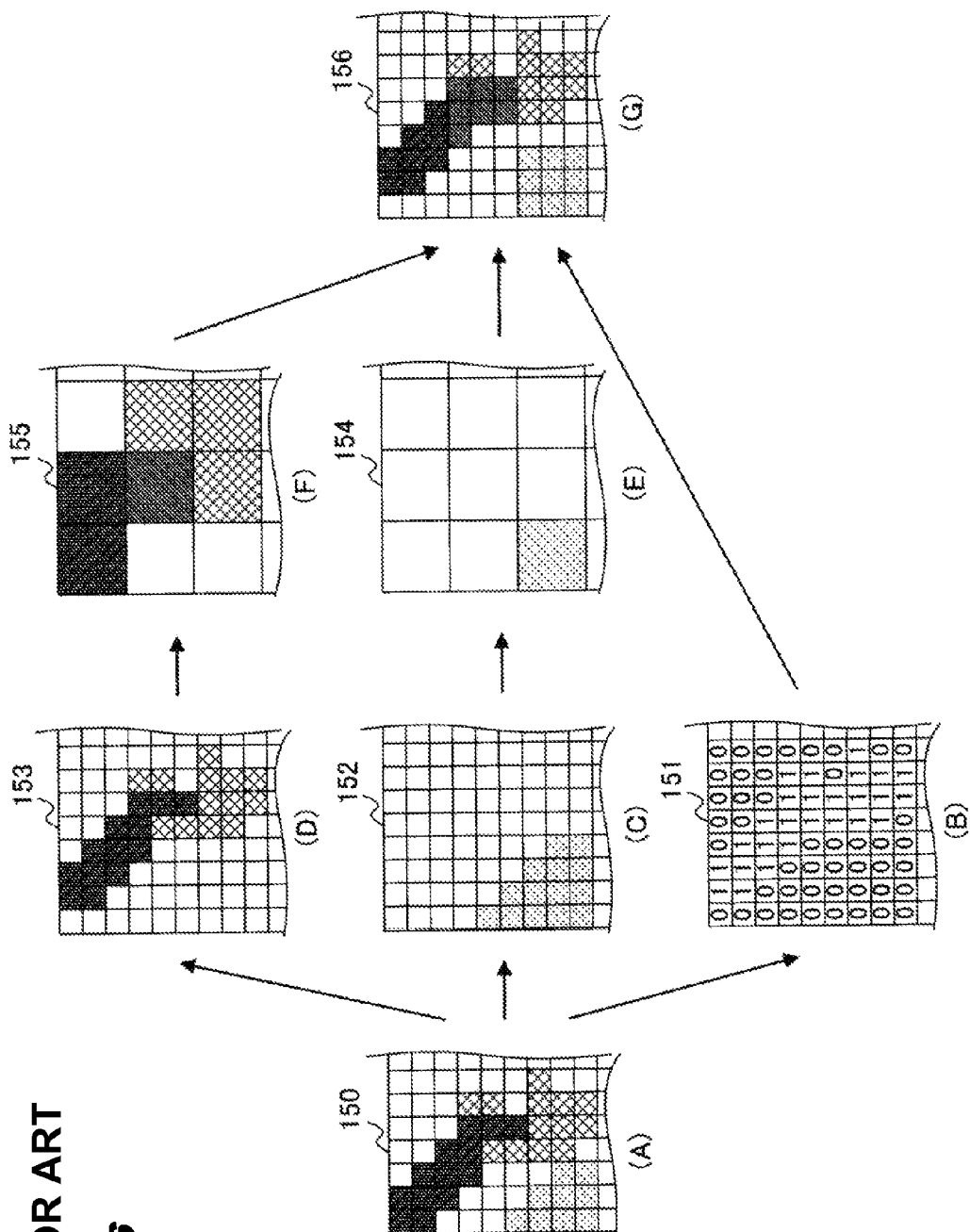
FIG. 6, which includes processes (A) to (G), is a schematic diagram that shows an example in the conventional method of compressing an original image in MRC and then decompressing it.

FIG. 6 is a schematic diagram that shows an example in the conventional method of compressing an original image in MRC and then decompressing it. FIG. 6 illustrates seven processes from (A) to (G). In the conventional method, from an original image 150 shown in (A) in FIG. 6, a mask image 151 (see (B) in FIG. 6) is generated. In the mask image 151, pixel values of pixels referred to as the background in the original image 150 are set to be "0", and pixel values of pixels referred to as the foreground in the original image 150 are set to be "1". Then, based on the mask image 151, from the original image 150, a background separation image 152 (see (C) in FIG. 6) and a foreground separation image 153 (see (D) in FIG. 6) are separated. Herein, the background separation image 152 and the foreground separation image 153 have the same resolution as that of the original image 150. The background separation image 152 sets pixel values of the pixels whose value in the mask image 151 are "0" to have the same values as those of the pixels in the original image 150. At this time, it is possible to process the background separation image 152 to obtain further preferable result as considering a later resolution change. For example, the processing ways are; spreading the pixel value of a pixel of the mask image 151 whose value is "0" to a surrounding pixel and adopting the value "0" as the pixel value of a pixel of the mask image 151 whose value is "1", and assuming that a pixel has a white background and adopting a pixel value that is used to white as the pixel value of a pixel of the mask image 151 whose value is "1." Also, a pixel value of a pixel in the foreground image 153 whose corresponding pixel in the mask image 151 has value "1" is set to be the same as the one of the original image 150. At this time, it is possible to process the foreground separation image 153 to obtain further preferable result as considering a later resolution change. For example, the processing ways are; spreading the pixel value of a pixel of the mask image 151 whose value is "1" to a surrounding pixel and adopting the value "1" as the pixel value of a pixel of the mask image 151 whose value is "0", and assuming that a pixel has a white background and adopting a pixel value that is used to white as the pixel value of a pixel of the mask image 151 whose value is "1." Next, the resolution change is performed on the background separation image 152 and the foreground separation image 153, and the reduction in the resolution is performed. Then, the background image 154 (see (E) in FIG. 6) and the foreground image 155 (see (F) in FIG. 6) are generated. Then, the pixel values of the pixels whose values are "0" in the mask image 151 are set to be the pixel values of the pixels in the same positions in the decompression image of the background image 154. The pixel values of the pixels whose values are "1" in the mask image 151 are set to be the pixel values of the pixels in the same positions in the decompression image of the foreground image 155. As a result, a decompression image 156 (see (G) in FIG. 6) is generated.

Figure 7:
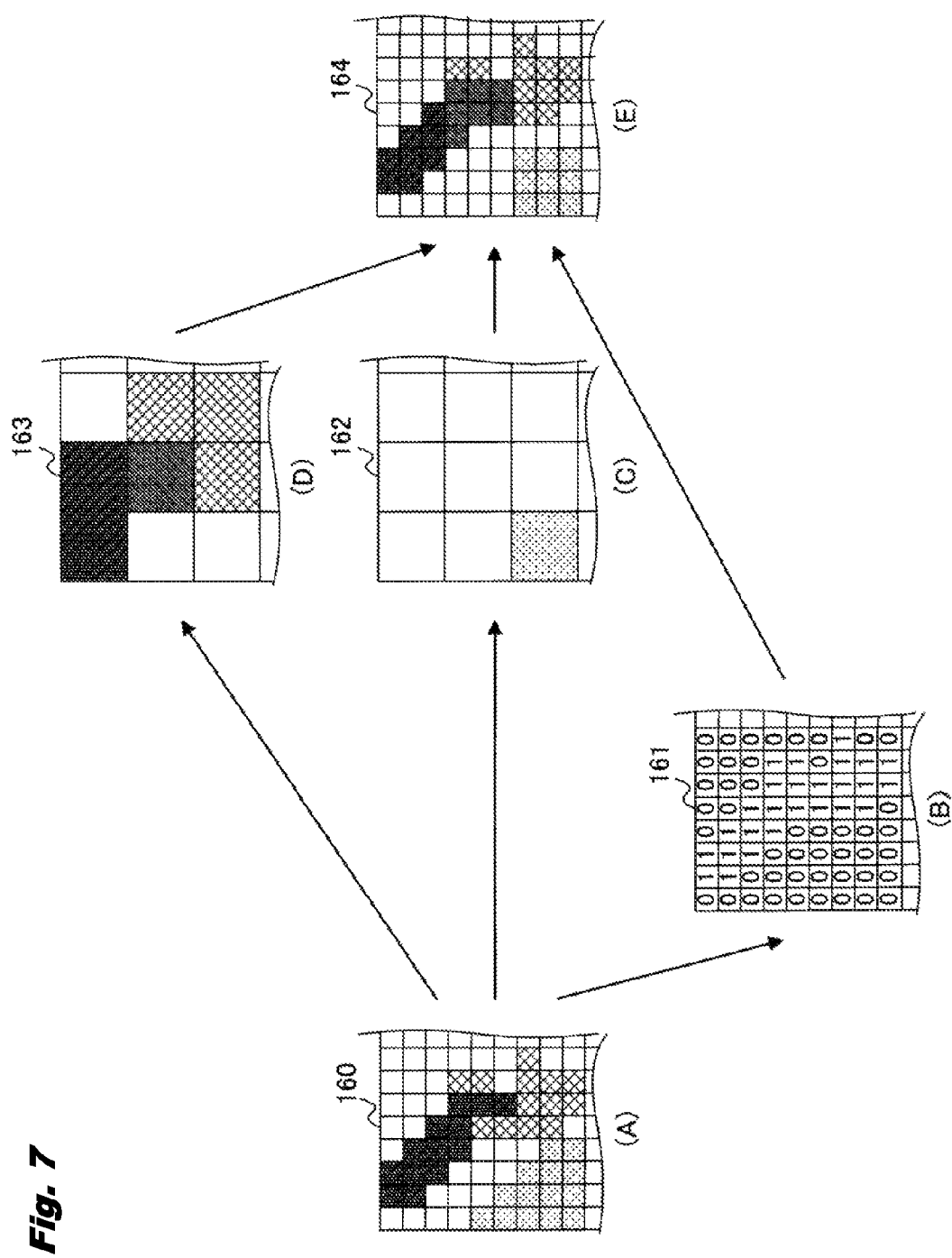
FIG. 7, which includes processes (A) to (E), shows a schematic diagram that shows an example in a method according to the first embodiment of compressing an original image in MRC and then decompressing it.

FIG. 7 shows a schematic diagram that shows an example in a method according to the first embodiment of compressing an original image in MRC and then decompressing it, illustrating processed from (A) to (E). In the first embodiment, from an original image 160 illustrated in (A) in FIG. 7, an attribute image 161 (see (B) in FIG. 7) is generated. In the attribute image 161, pixel values of pixels referred to as the background in the original image 160 are "0" and pixel values of pixels referred to as the foreground in the original image 160 are "1." The attribute image 161 is the same image as the mask image 151 illustrated in (B) in FIG. 6. Next, in the first embodiment, based on the attribute image 161, separation from the original image 160 and the resolution change are simultaneously performed, and a background image 162 (see (C) in FIG. 7) and a foreground image 163 (see (D) in FIG. 7) are generated. Based on pixel values of pixels included in a unit block in the attribute image 161, methods for the separation from the original image 160 and the resolution change vary depending on whether all of the pixels included in the unit block are foreground, whether all of the pixels included in the unit block are background, and whether an edge between the foreground and the background is included in the unit block. Then, the pixel values of the pixels whose values are "0" in the attribute image 161 are set to be the pixel values of the pixels in the same positions in the decompression image of the background image 162. The pixel values of the pixels whose values are "1" in the attribute image 161 are set to be the pixel values of the pixels in the same positions in the decompression image of the foreground image 163. As a result, a decompression image 164 (see (E) in FIG. 7) is generated.

Figure 8:
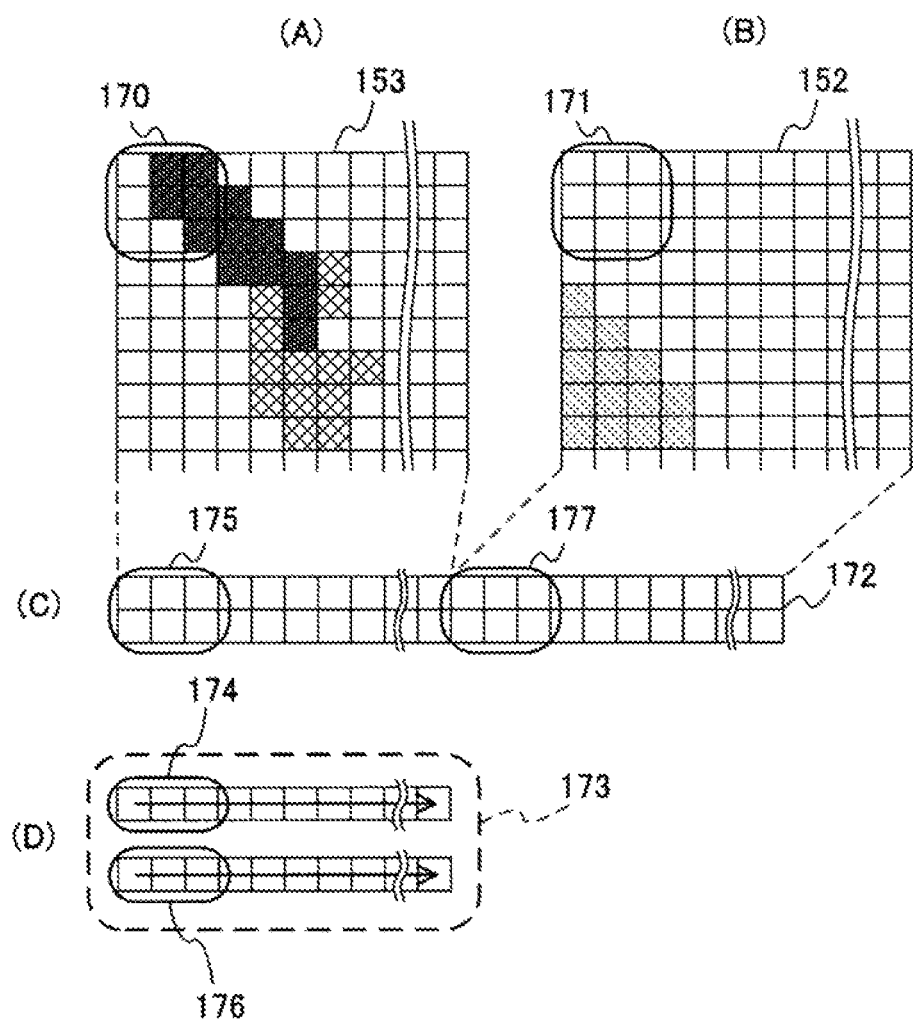
FIG. 8 is a schematic diagram of a buffer required to perform resolution change in the conventional method, the resolution change being to change a pixel value of a 3×3 pixel to a pixel value of one pixel.
Figure 9:
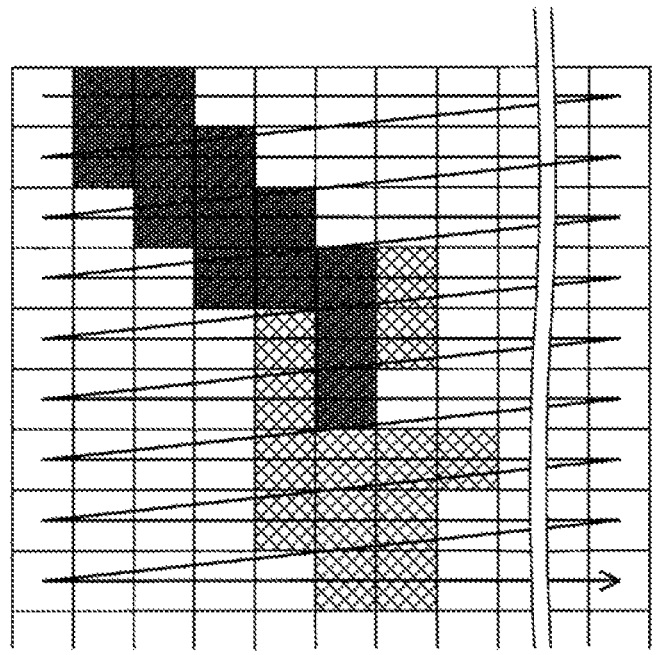
FIG. 9 is a schematic view that shows raster scan of manuscript.

FIG. 8 is a schematic diagram of a buffer required to perform resolution change in the conventional method, the resolution change being to change a pixel value of a 3×3 pixel to a pixel value of one pixel. As illustrated in FIG. 9, a manuscript is raster scanned, and input image data is input for each line from the leftmost column. In order to calculate a pixel value of one pixel from a pixel group 170 of 3×3 pixel in the foreground separated image 153 illustrated in (A) in FIG. 8 and a pixel value of one pixel from a pixel group 171 of 3×3 pixel in the background separated image 152 illustrated in (B) in FIG. 8, the buffer 172 needs a capacity that allows storage of respective two lines of data of the foreground image and the background image, as illustrated in (C) in FIG. 8. Image data 174 of three pixels of the foreground in input image data 173 illustrated in (D) in FIG. 8 and data 175 that is data two lines before and one line before the image data 174 is combined, so that information of the pixel group 170 of 3×3 pixels is obtained. In the same way, image data 176 of three pixels of the background in the input image data 173 illustrated in (D) in FIG. 8 and data 177 that is data two lines before and one line before the image data 176 is combined, so that information of the pixel group 171 of 3×3 pixels is obtained. In the conventional method, the buffer that is capable of storing respective two lines of data of the foreground and background before the resolution change is required.

Figure 10:
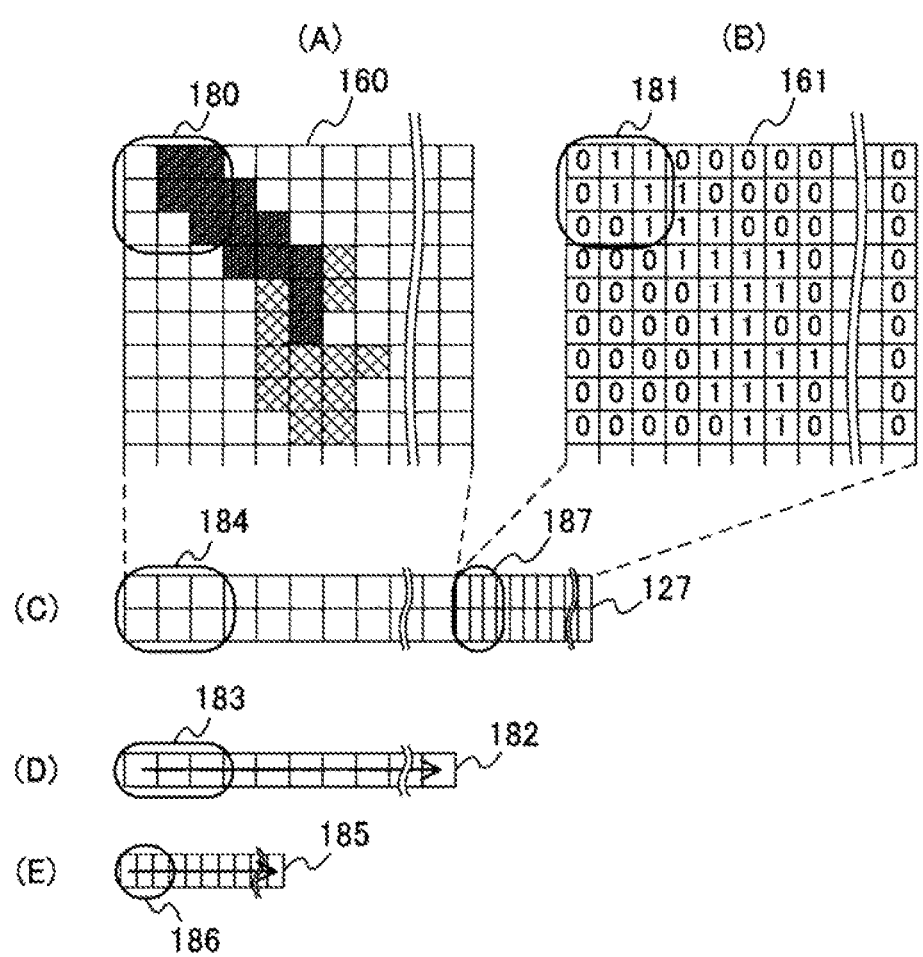
FIG. 10 is a schematic diagram of a buffer required to perform resolution change in a method in the first embodiment, the resolution change being to change a pixel value of a 3×3 pixel to a pixel value of one pixel.

FIG. 10 is a schematic diagram of a buffer required to perform resolution change in a method in the first embodiment, the resolution change being to change a pixel value of a 3×3 pixel to a pixel value of one pixel. Note, herein, as illustrated in FIG. 9, the manuscript has been raster scanned, and input image data for each line is input to the foreground background generation part 123. In order to calculate a pixel value of one pixel from a pixel group 180 of 3×3 pixel in the original image 160 illustrated in (A) in FIG. 10 and a pixel value of one pixel from a pixel group 181 of 3×3 pixel in the attribute image 161 illustrated in (B) in FIG. 10, the image processing buffer 124 needs a capacity that allows storage of respective two lines of data of the original image 160 and the attribute image 161, as illustrated in (C) in FIG. 10. Because the attribute image 161 is data that one pixel is one bit, a capacity of the image processing buffer 124 can be made smaller as compared to one for memorizing data that one pixel is 24 bit, which is generally used for representing full color data as the background separation image 152 as illustrated in (B) in FIG. 8, for example. Image data 183 of three pixels in the input image data 182 illustrated in (D) in FIG. 10 and image data 184 that is data two lines before and one line before the image data 183 is combined, so that information of the pixel group 180 of 3×3 pixels is obtained. In the same way, image data 186 of three pixels in the input attribute image data 185 illustrated in (D) in FIG. 10 and data 187 that is data two lines before and one line before is combined, so that information of the pixel group 181 of 3×3 pixels is obtained.

As described above, according to the first embodiment, a required capacity of the buffer can be made smaller as compared to the conventional method in which the background separation image and the foreground separation image are separated from the original image, the resolution change is performed, and then the background image and the foreground image are generated. Furthermore, according to the first embodiment, even in border areas of foregrounds and backgrounds where colors are less likely to be stable, colors suitable for the foregrounds and backgrounds are led by switching the resolution change process depending on the distribution of the foreground and background in a unit block of 3×3 pixels.

In the first embodiment, as illustrated in the flow diagram in FIG. 4, the number N1 of reference target pixels of the foreground and the number N2 of reference target pixels of the background are counted (S20), and respective change pixel values of the foreground and the background are specified depending on the counted numbers. However, it is not limited to this example. For example, the foreground background generation part 123 may specify respective change pixel values of the foreground and background following a process illustrated in FIG. 11.

Figure 11:
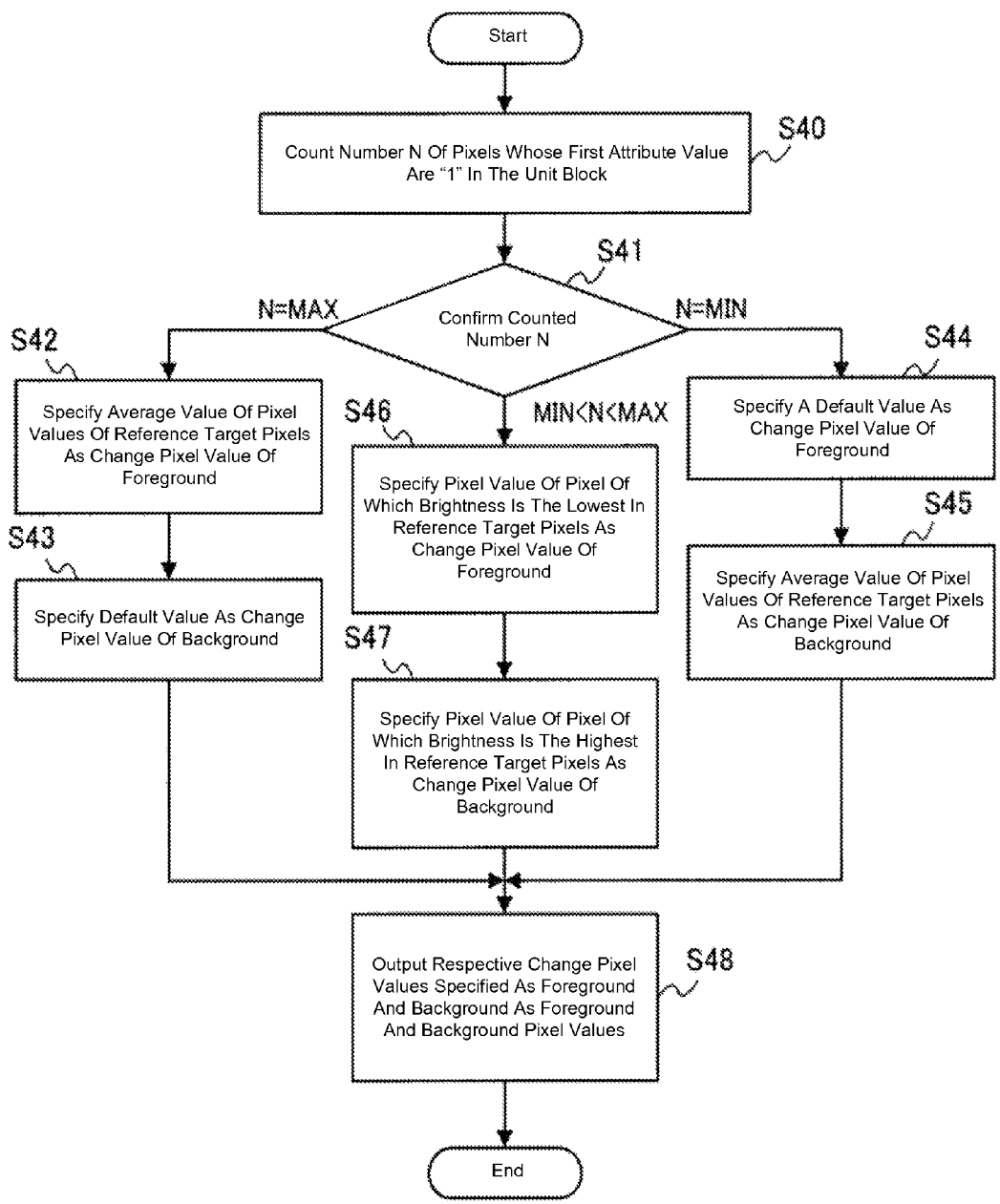
FIG. 11 is a flow diagram that shows a modified example of a process of generating foreground image data and background image data according to the first embodiment.

FIG. 11 is a flow diagram that shows a modified example of a process that the foreground background generation part 123 generates foreground image data and background image data. Also in this modified example, the foreground background generation part 123 sets a region of 3×3 pixels as a unit block, which is a unit for resolution change. The foreground background generation part 123 calculates a pixel value of one pixel from pixel values of pixels in the unit block, and then decreases the resolution of image data.

The attribute edge determination part 123a counts the number N of pixels whose first attribute value is "1" in the unit block based on the input attribute image data sent from the attribute image generation part 122 (S40).

Next, the attribute edge determination part 123a confirms the counted number N (S41). When the number N is a maximum number (herein "9"), the attribute edge determination part 123a determines that all pixels in the unit block are foreground pixels, and the process proceeds to S42. When the number N is a minimum number (herein "0"), the attribute edge determination part 123a determines that all pixels in the unit block are background pixels, and the process proceeds to S44. When the number is larger than the minimum number and smaller than the maximum number, the attribute edge determination part 123a determines that there is an edge between the background and foreground in the unit block, and then the process proceeds to S46.

In S42, the foreground background generation part 123 specifies an average value of pixel values of pixels in the unit block as a change pixel value of the foreground as a resolution change result. Next, the foreground background generation part 123 specifies a second default value (herein, a pixel value of white pixel) as a change pixel value of the background (S43). The second default value is a value predetermined to recognize pixels as background.

In S44, the foreground background generation part 123 specifies a first default value (herein, a pixel value of black pixel) as a change pixel value of the foreground. The first default value is a value predetermined to distinguish letters and lines that are foreground. Next, the foreground background generation part 123 specifies an average value of pixel values of pixels in the unit block as a change pixel value of the background as a resolution change result (S45).

In S46, the foreground background generation part 123 specifies a pixel value of a pixel of which brightness is the lowest in the pixels in the unit block as a change pixel value of the foreground. Next, the foreground background generation part 123 specifies a pixel value of a pixel of which brightness is the highest in the pixels in the unit block as a change pixel value of the background (S47).

Then, the foreground background generation part 123 sends the change pixel value of the foreground, which is specified as described above, as a pixel value of the foreground image data to the format part 125, and sends the change pixel value of the background, which is specified as described above, as a pixel value of the background image data to the format part 125 (S48).

According to the flow diagram illustrated in FIG. 11, it is not necessary to count the respective numbers of reference target pixels of the foreground and background.

Second Embodiment

As illustrated in FIG. 1, an image processing apparatus 200 according to the second embodiment includes an image input part 110 and a controller 220. The image processing apparatus 200 according to the second embodiment is different from the image processing apparatus 100 according to the first embodiment in the controller 220. Note, the image processing apparatus 200 executes an image processing method according to the second embodiment.

Figure 12:
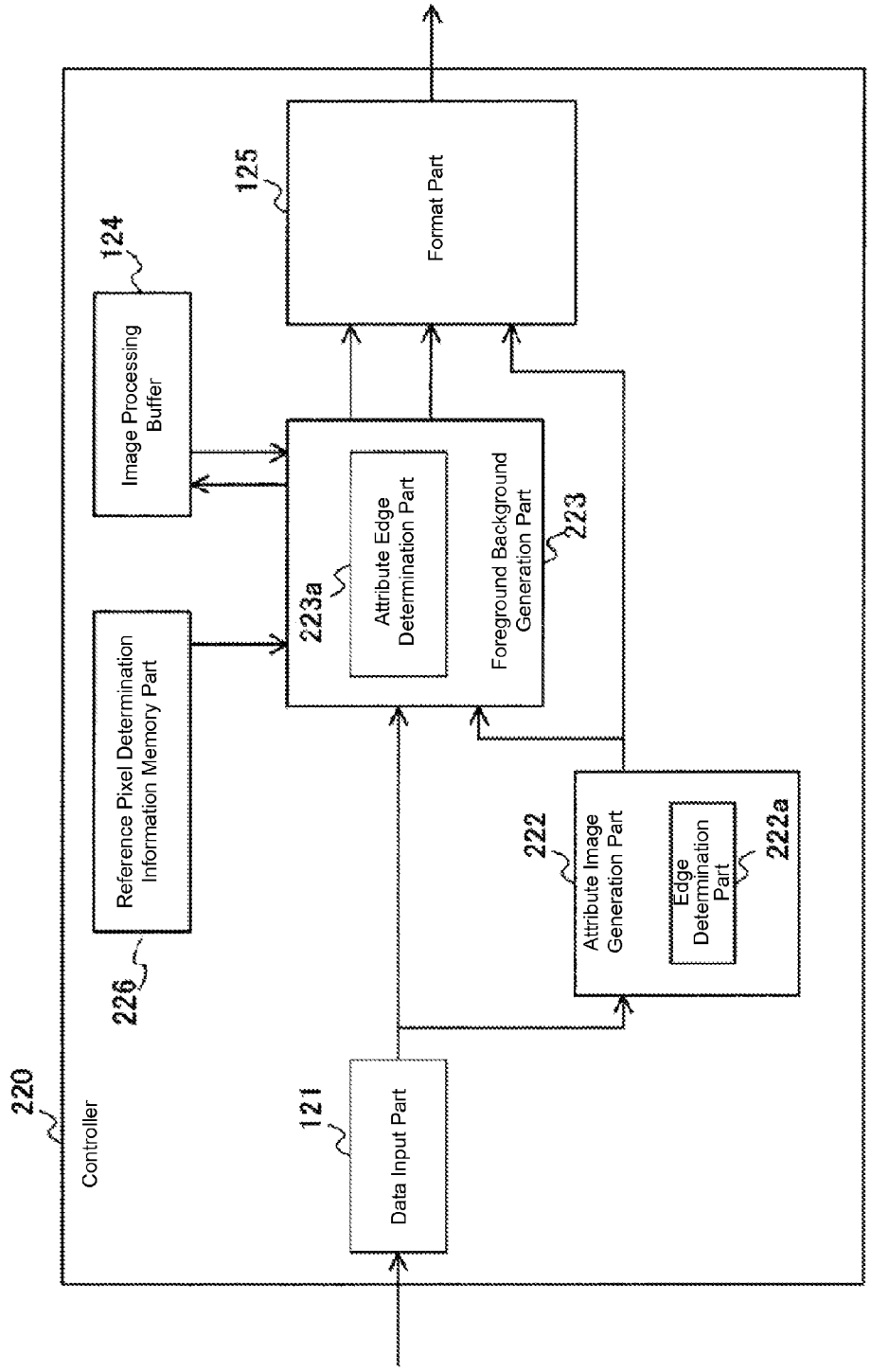
FIG. 12 is a block diagram that schematically shows a configuration of a controller according to the second embodiment.

FIG. 12 is a block diagram that schematically shows a configuration of the controller 220 according to the second embodiment. The controller 220 according to the second embodiment includes the data input part 121, an attribute image generation part 222, a foreground background generation part 223, the image processing buffer 124, the format part 125, and a reference pixel determination information memory part 226. The controller 220 according to the second embodiment is different from the controller 120 according to the first embodiment in the processes performed by the attribute image generation part 222 and the foreground background generation part 223 as well as that the reference pixel determination information memory part 226 is further provided.

The attribute image generation part 222 specifies the first attribute value and the second attribute value based on the input image data sent from the data input part 121. The first attribute value shows whether a pixel is a pixel included in one region of text region and line region. The second attribute value shows whether a pixel is an edge pixel of the foreground image and the background image. Then, the attribute image generation part 222 generates attribute image data that shows the first attribute value and the second attribute value for each pixel. For example, in the attribute image data, the first attribute value and the second attribute value are respectively shown with one bit, so each pixel has data of two bits. Because the input image data is data for each line, the attribute image generation part 222 generates image data for each line as attribute image data, and the image data (hereinafter, referred to as input attribute image data) for each line is sent to the foreground background generation part 223 and the format part 125. Herein, the attribute image generation part 222 includes an edge determination part 222a. The edge determination part 222a determines whether a pixel is an edge pixel based on the input image data sent from the data input part 121. For the determination of edge pixels, prior arts may be used so that the detail description is omitted.

The reference pixel determination information memory part 226 is a memory part that memorizes reference pixel determination information that specifies whether a pixel to be specified is attributed to the foreground image or the background image based on the combination of the first attribute value and the second attribute value. FIGS. 13A and 13B are schematic charts that show a foreground reference pixel determination table 290 and a background reference pixel determination table 291 included in reference pixel determination information.

As illustrated in FIG. 13A, the foreground reference pixel determination table 290 includes a first attribute value column 290a, a second attribute value column 290b, and a foreground reference pixel determination value column 290c. The first attribute value column 290a stores a value of the first attribute value. The second attribute value column 290b stores a value of the second attribute value. The foreground reference pixel determination value column 290c stores information that shows whether a pixel value of a pixel shown by the input attribute image data is used as a pixel referred as the foreground when the pixel value matches one of values stored in the first attribute value column 290a and the second attribute value column 290b. For example, a pixel that information stored in the column is "Refer" is used as a pixel referred as the foreground (pixel attributed to the foreground image), and a pixel that information stored in the column is "Not Refer" is used as a pixel not referred as the foreground (pixel attributed to the background image).

As illustrated in FIG. 13B, the background reference pixel determination table 291 includes a first attribute value column 291a, a second attribute value column 291b, and a foreground reference pixel determination value column 291c. The first attribute value column 291a stores a value of the first attribute value. The second attribute value column 291b stores a value of the second attribute value. The foreground reference pixel determination value column 291c stores information that shows whether a pixel value of a pixel shown by the input attribute image data is used as a pixel referred as the foreground when the pixel value matches one of values stored in the first attribute value column 291a and the second attribute value column 291b. For example, a pixel that information stored in the column is "Refer" is used as a pixel referred to as the foreground (pixel attributed to the background image), and a pixel that information stored in the column is "Not Refer" is used as a pixel not referred to as the foreground (pixel attributed to the foreground image).

The foreground background generation part 223 divides image data of an original image into a plurality of unit blocks that is configured with a plurality of pixels. Hereinafter, in order to simplify description, the unit blocks may be described in a singular form. The foreground background generation part 223 changes pixel values of the plurality of pixels to a pixel value of one pixel as referring to the first attribute value and the second attribute value included in the attribute image data, and then generates image data of a first compression image that includes a compression image of the first part image and image data of a second compression image that includes a compression image of the second part image that is other part of the original image than the first part image. For example, the foreground background generation part 223 specifies a pixel recognized as the foreground and a pixel recognized as the background based on the input attribute image data sent from the attribute image generation part 222, and performs resolution change of the input image data sent from the data input part 121 simultaneously on the foreground and background, and then generates foreground data and background data. Specifically, regarding the input image data and the input attribute image data, the foreground background generation part 123 lets the image processing buffer 124 memorize data of lines required for the resolution change, refers to the data, performs the resolution change on the original image data, and generates the foreground image data and background image data. Then, the foreground background generation part 223 sends the generated foreground image data and background image data to the format part 125. The foreground background generation part 223 is provided with an attribute edge determination part 223a. The attribute edge determination part 223a performs determination whether a unit block includes an edge based on the attribute image data. Specifically, the attribute edge determination part 223a determines, based on the first attribute value and the second attribute value included in the attribute image data sent from the attribute image generation part 222, whether all pixels included in a unit block are attributed to the foreground image, whether all pixels in an unit block are attributed to the background image, or whether all pixels in an unit block are attributed to both the foreground image and the background image. Specifically, the attribute edge determination part 223a according to the second embodiment counts the numbers of pixels referred to as the foreground and pixels referred to as the background based on the reference pixel determination information memorized in the reference pixel determination information memory part 226, and determines whether the unit block includes an edge depending on the counted numbers. The foreground background generation part 223 switches methods of the resolution changes of the foreground and background based on the determination result of the attribute edge determination part 223a.

Note, the controller 220 may be realized by a part of a circuit that performs a signal process or by assembled circuits, and may be realized by software that is operated by a commonly used hardware.

Figure 14:
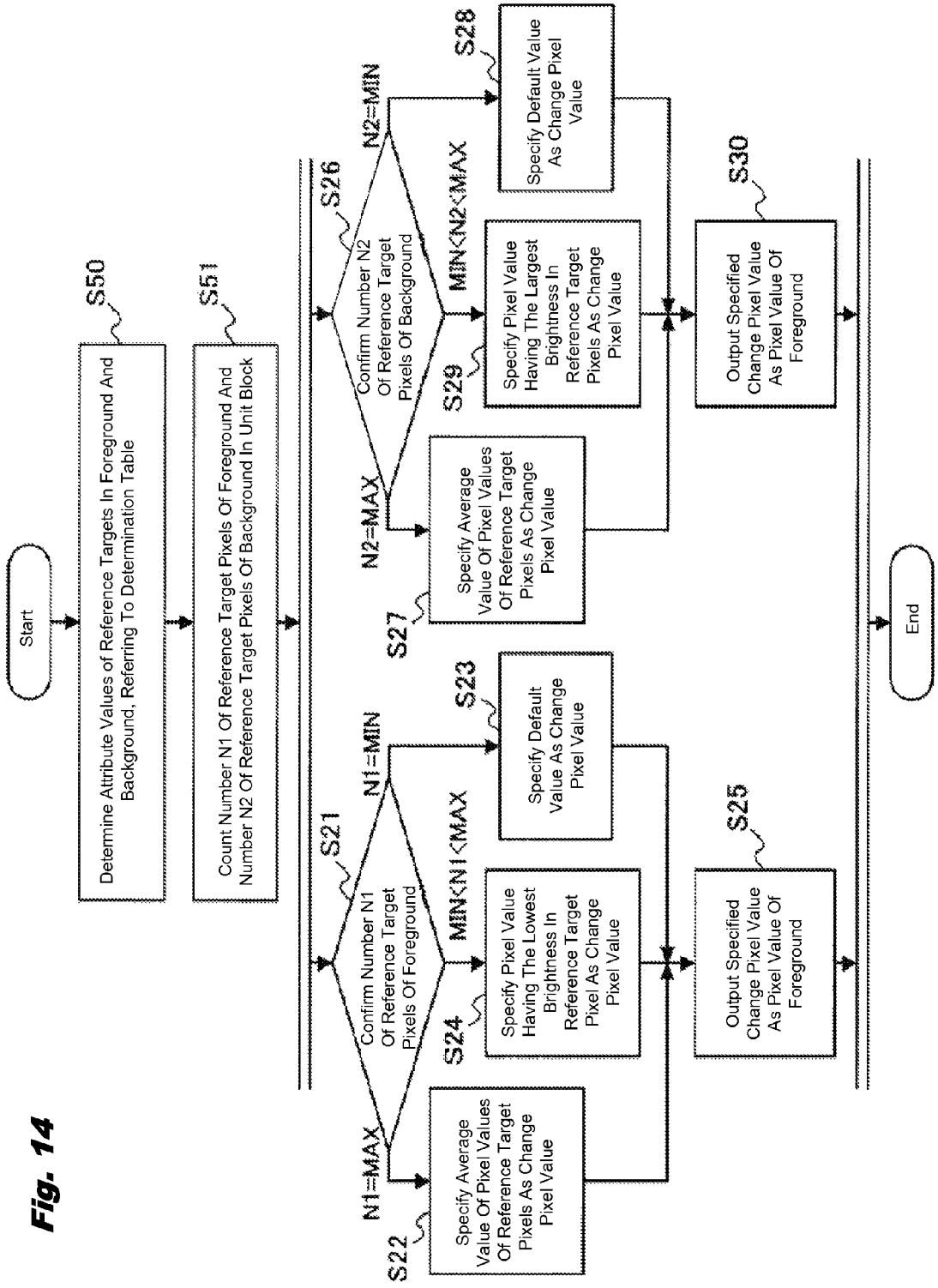
FIG. 14 is a flow diagram that shows a process of generating foreground image data and background image data according to the second embodiment.

(Description of Operation) FIG. 14 is a flow diagram that shows a process that the foreground background generation part 223 generates foreground image data and background image data. Note, in the flow illustrated in FIG. 14, the same reference numbers are given to the process the same as the ones in the flow illustrated in FIG. 4. Also in the second embodiment, a region of 3×3 pixels is used as a unit block, which is a unit for resolution change. The foreground background generation part 223 decreases the resolution of image data by calculating a pixel value of one pixel in pixel values of pixels included in the unit block.

The attribute edge determination part 223a specifies a pixel referred to as the foreground and a pixel referred to as the background based on the reference pixel determination information memorized in the reference pixel determination information memory part 226 (S50). For example, when the foreground reference pixel determination table 290 included in the reference pixel determination information is the one illustrated in FIG. 13A, in the pixel value shown by the input attribute image data sent from the attribute image generation part 122, when the first attribute value is "1" and the second attribute value is "1" or "0", a pixel having such pixel value is a pixel referred as the foreground. Also, the foreground reference pixel determination table 290 included in the reference pixel determination information is the one illustrated in FIG. 13B, in the pixel value shown by the input attribute image data sent from the attribute image generation part 122, when the first attribute value is "0" and the second attribute value is "0", a pixel having such pixel value is a pixel referred to as the background.

The attribute edge determination part 223a counts number N1 of pixels referred to as the foreground and number N2 of pixels referred to as the background based on the input attribute image data sent from the attribute image generation part 222 (S51). Then, after S51, the foreground background generation part 223 proceeds to the processes of S21 and S26, determines the existence of an edge of the foreground and background in the unit block depending on the counted numbers by the attribute edge determination part 223a, and switches the process of resolution change. Note, the processes of S21-S30 are the same as the ones of S21-S30 that are described in FIG. 4.

(Description of Effects of Second Embodiment) Also in the second embodiment as the same as the first embodiment, separation and resolution change can be realized with a smaller buffer as compared to the conventional method.

Also as illustrated in FIG. 13, by using the foreground reference pixel determination table 290 and the background reference pixel determination table 291, it is possible to set a background reference pixel to eliminate an edge pixel that has a large effect of blur in the background, and it is also possible to set a foreground reference pixel to include an edge pixel to collect color information of fine lines in the foreground. As a result, it is possible to generate pixel information respectively suitable for the foreground and background as using highly precise edge information detected by the attribute image generation part 222.

Note, in the second embodiment, the method of using the attribute image data that includes an attribute value of two bits that is the first attribute that shows whether a pixel is in a text region and a line region and the second attribute that shows whether a pixel is an edge pixel is explained. However, it is not limited to the example. For example, it is also possible to use attribute image data that shows pixel emphasis data such as color emphasis information and half dot determination information of the original image as an attribute value as using more bits. However, when an attribute value is set to have an amount of x bit, a size of the table that determines reference pixels is $2^x$, and an information amount that shows one pixel is 24+x bit in addition to color information. The larger the information amount of the attribute value that is used for generating the foreground and background, the larger the size of the table and the required buffer become.

The image processing apparatuses 100 and 200 disclosed in the first and second embodiments are applicable to an apparatus that saves images of manuscripts in a image format that is capable of multilayer structure representation such as PDF, which is for example a scanner and a multifunction peripheral.

What is claimed is:

1. An image processing apparatus, comprising:
   an attribute image generation part that analyses image data of an original image and generates image data of an attribute image for each pixel, the attribute image having a first attribute value that shows whether or not a pixel is attributed to a predetermined first part image;
   a compression image generation part that, by dividing the image data of the original image into a plurality of unit blocks each of which has a plurality of pixels, by referring to the image data of the attribute image and by changing pixel values of the plurality of pixels included in each of the plurality of unit blocks to a pixel value of one pixel, generates image data of a first compression image that includes a compression image of the first part image and image data of a second compression image that includes a compression image of a second part image that is other part of the original image than the first part image; and
   a format part that generates, based on the image data of the attribute image, image data that shows the first attribute value for each pixel as selection data, the selection data being used to select a pixel value of each pixel from the image data of the first compression image and the image data of the second compression image, and generates data in a multilayer data format that includes the selection data, the image data of the first compression image and the image data of the second compression image.

2. The image processing apparatus according to claim 1, wherein,
   the compression image generation part
      refers to the image data of the attribute image,
      determined whether all of the plurality of pixels included in each of the plurality of unit blocks are attributed to the first part image, whether all of the plurality of pixels in each of the plurality of unit blocks are attributed to the second part image, or whether all of the plurality of pixels in each of the plurality of unit blocks are attributed to both the first part image and the second part image, and
      changes the pixel values of the plurality of pixels included in each of the plurality of unit blocks to a pixel value of one pixel.

3. The image processing apparatus according to claim 2, wherein, the attribute image generation part arranges such that the image data of the attribute image includes a second attribute value that shows whether a pixel is an edge pixel of the first part image and the second part image, and the compression image generation part determines, based on the first attribute value and the second attribute value, whether all of the plurality of pixels included in each of the plurality of unit blocks are attributed to the first part image, whether all of the plurality of pixels in each of the plurality of unit blocks are attributed to the second part image, or whether all of the plurality of pixels in each of the plurality of unit blocks are attributed to both the first part image and the second part image.

4. The image processing apparatus according to claim 3, further comprising:

a memory part that memorizes reference pixel determination information specifying whether a pixel to be specified is attributed to the first part image or the second part image according to a combination of the first attribute value and the second attribute value, wherein the compression image generation part determines, based on the reference pixel determination information, whether all of the plurality of pixels included in each of the plurality of unit blocks are attributed to the first part image, whether all of the plurality of pixels in each of the plurality of unit blocks are attributed to the second part image, or whether all of the plurality of pixels in each of the plurality of unit blocks are attributed to both the first part image and the second part image.

5. The image processing apparatus according to claim 1, wherein, the image data of the attribute image further includes pixel emphasis data regarding the original image.

6. The image processing apparatus according to claim 1, further comprising;

an image input part that obtains the image data of the original image from a manuscript.

7. An image processing method, comprising:

an attribute image generation process that analyses image data of an original image and generates image data of an attribute image for each pixel, the attribute image having a first attribute value that shows whether a pixel is attributed to a predetermined first part image;

an image generation process that, by dividing the image data of the original image into a plurality of unit blocks each of which has a plurality of pixels, by referring to the image data of the attribute image, and by changing pixel values of the plurality of pixels included in each of the plurality of unit blocks to a pixel value of one pixel, generates image data of a first compression image that includes a compression image of the first part image and image data of a second compression image that includes a compression image of a second part image that is other part of the original image than the first part image; and a format process that generates image data that shows the first attribute value for each pixel as selection data based on the image data of the attribute image, the selection data being used to select a pixel value of each pixel from the image data of the first compression image and the image data of the second compression image, and generates data in a multilayer data format that includes the selection data, the image data of the first compression image, and the image data of the second compression image.

* * * * *